(12) United States Patent
Kim et al.

(10) Patent No.: US 11,598,411 B2
(45) Date of Patent: Mar. 7, 2023

(54) MOTOR OPERATING MODULE

(71) Applicant: HYUNDAI MOBIS CO., LTD., Seoul (KR)

(72) Inventors: Nam Seok Kim, Yongin-si (KR); Sang Han Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/381,673

(22) Filed: Jul. 21, 2021

(65) Prior Publication Data
US 2022/0025967 A1     Jan. 27, 2022

(30) Foreign Application Priority Data
Jul. 22, 2020     (KR) .................. 10-2020-0091209

(51) Int. Cl.
| | |
|---|---|
| *F16H 57/04* | (2010.01) |
| *H02K 5/04* | (2006.01) |
| *H02K 9/19* | (2006.01) |
| *H02K 5/20* | (2006.01) |
| *F16H 57/02* | (2012.01) |
| *H02K 7/116* | (2006.01) |

(52) U.S. Cl.
CPC ..... *F16H 57/0476* (2013.01); *F16H 57/0412* (2013.01); *F16H 57/0424* (2013.01); *H02K 5/203* (2021.01); *H02K 9/19* (2013.01); *F16H 57/0457* (2013.01); *F16H 2057/02034* (2013.01); *H02K 7/116* (2013.01)

(58) Field of Classification Search
CPC ............. F16H 57/0412; F16H 57/0424; F16H 57/0457; F16H 57/0476; F16H 2057/02034; H02K 5/20; H02K 5/203; H02K 7/116; H02K 9/19
See application file for complete search history.

(56) References Cited

U.S. PATENT DOCUMENTS

| | | | |
|---|---|---|---|
| 7,156,195 B2* | 1/2007 | Yamagishi | H02K 9/19 310/60 A |
| 8,456,045 B2* | 6/2013 | Hayashi | F16H 57/045 310/113 |
| 9,303,698 B2* | 4/2016 | Sugiyama | F16D 25/10 |
| 9,701,204 B2* | 7/2017 | Suzuki | B60K 17/043 |
| 9,729,026 B2* | 8/2017 | Makino | B60K 7/0007 |

(Continued)

FOREIGN PATENT DOCUMENTS

| | | | | |
|---|---|---|---|---|
| CN | 103904826 A | * | 7/2014 | ............ H02K 9/19 |
| CN | 112594357 A | * | 4/2021 | |
| WO | WO-2011101911 A1 | * | 8/2011 | ............ B60L 3/0061 |

*Primary Examiner* — Adam D Rogers
(74) *Attorney, Agent, or Firm* — NSIP Law

(57) ABSTRACT

A motor operating module includes a motor including a rotor and a stator, a gear unit provided on one side of the motor, and being configured to receive torque of the rotor and to transmit the torque to outside, and a housing configured to accommodate the motor and the gear unit in an inner space including a front space formed on a first side, a rear space formed on a second side opposite to the first side, and rear-facing connection flow paths extending from the front space toward the rear space to provide a path for a cooling fluid to flow, such that a motor may be cooled by using a churning effect of an oil caused by rotation of a gear without a separate operating device such as a pump.

14 Claims, 7 Drawing Sheets

(56) References Cited

U.S. PATENT DOCUMENTS

| | | | |
|---|---|---|---|
| 10,550,929 B2* | 2/2020 | Ahn | F16H 57/0421 |
| 10,746,282 B2* | 8/2020 | Ito | F16H 57/0435 |
| 10,868,452 B2* | 12/2020 | Yamaguchi | H02K 1/276 |
| 2012/0080286 A1* | 4/2012 | Kasuya | B60L 50/15 |
| | | | 192/113.3 |
| 2020/0136471 A1* | 4/2020 | Fukunaga | H02K 9/193 |
| 2021/0006132 A1* | 1/2021 | Steinz | F16H 57/0415 |
| 2022/0196135 A1* | 6/2022 | Tamura | F16H 57/021 |
| 2022/0205529 A1* | 6/2022 | Takada | H02K 7/08 |

* cited by examiner

MOTOR OPERATING MODULE

CROSS-REFERENCE TO RELATED APPLICATION(S)

This application claims the benefit under 35 U.S.C. § 119(a) of Korean Patent Application No. 10-2020-0091209, filed on Jul. 22, 2020, in the Korean Intellectual Property Office, the entire contents of which are incorporated herein by reference for all purposes.

BACKGROUND

1. Field

The following description relates to a motor operating module for performing a cooling function without separate power for cooling.

2. Description of Related Art

Motors for converting electric energy into kinetic energy may be mounted to devices in various fields, and for example, such a motor may be mounted to an automobile and produce a driving force of the automobile. In particular, as demands for eco-friendly automobiles for solving environmental pollution caused by existing internal-combustion engines increase, demands for motors mounted to the automobiles also increase rapidly.

Also, since heat is generated around a motor during operation, a cooling fluid for cooling the motor circulates around the motor and the surroundings thereof. For example, an oil is supplied to the motor and a reducer connected to the motor and performs not only a lubrication action but also a cooling function.

However, according to the related art, a separate component such as a pump was required to circulate the oil for cooling. Also, according to the related art, a portion of the oil for cooling did not properly contribute to cooling during the circulation of the oil, and thus, cooling efficiency became deteriorated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided a motor operating module including a motor including a rotor and a stator, a gear unit provided on one side of the motor, and being configured to receive torque of the rotor and to transmit the torque to outside, and a housing configured to accommodate the motor and the gear unit in an inner space, wherein the inner space of the housing comprises a front space formed on a first side of the motor, a rear space formed on a second side of the motor opposite to the first side, rear-facing connection flow paths extending from the front space toward the rear space and providing a path for a cooling fluid to flow, and the cooling fluid is churned by the rotation of the gear unit to flow from a lower region of the housing into the rear space via the rear-facing connection flow paths.

The gear unit may include an input gear coupled to the motor, and an output gear configured to receive the torque of the rotor from the input gear, wherein the cooling fluid is churned by the rotation of the output gear and flows into the rear space via the rear-facing connection flow paths.

Each of the rear-facing connection flow paths may include a first rear-facing connection flow path formed in an outer region of the input gear, wherein the outer region of the input gear faces an outer surface of the housing.

The gear unit may include a transmission gear engaging with the input gear and the output gear and being configured to transmit the torque of the rotor from the input gear to the output gear, wherein the each of the rear-facing connection flow paths further comprises a second rear-facing connection flow path formed between the output gear and the transmission gear.

One of a portion of the first rear-facing connection flow path or a portion of the second rear-facing connection flow path may include a section inclined downward toward the rear space.

One of a portion of the first rear-facing connection flow path or a portion of the second rear-facing connection flow path may include a section facing the outer surface of the housing.

The rear space may communicate with the stator, and the cooling fluid may flow into the stator.

The cooling fluid may flow into a lower region of the stator.

The inner space of the housing may include a stator-facing connection flow path that extends from the front space toward the stator and provides a path through which the cooling fluid flows, wherein the cooling fluid in the lower region of the housing may be churned by the rotation of the gear unit and may flow into the front space, and into the stator via the stator-facing connection flow path.

A plurality of stator-facing connection flow paths may be provided.

The stator-facing connection flow path may include a first stator-facing connection flow path formed in a region of the transmission gear on an opposite side from a region facing the output gear.

The stator-facing connection flow path may include a second stator-facing connection flow path formed in a region of the input gear on the opposite side from a region facing the transmission gear.

A plurality of first stator-facing connection flow paths may be formed along a circumferential direction of the transmission gear.

A plurality of second stator-facing connection flow paths may be formed along a circumferential direction of the input gear.

The first stator-facing connection flow path may be formed above the second stator-facing connection flow path.

The cooling fluid may flow from the front space into the first stator-facing connection flow path and into an upper region of the stator.

The cooling fluid may flow from the front space into the second stator-facing connection flow path and into a lower region of the stator.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
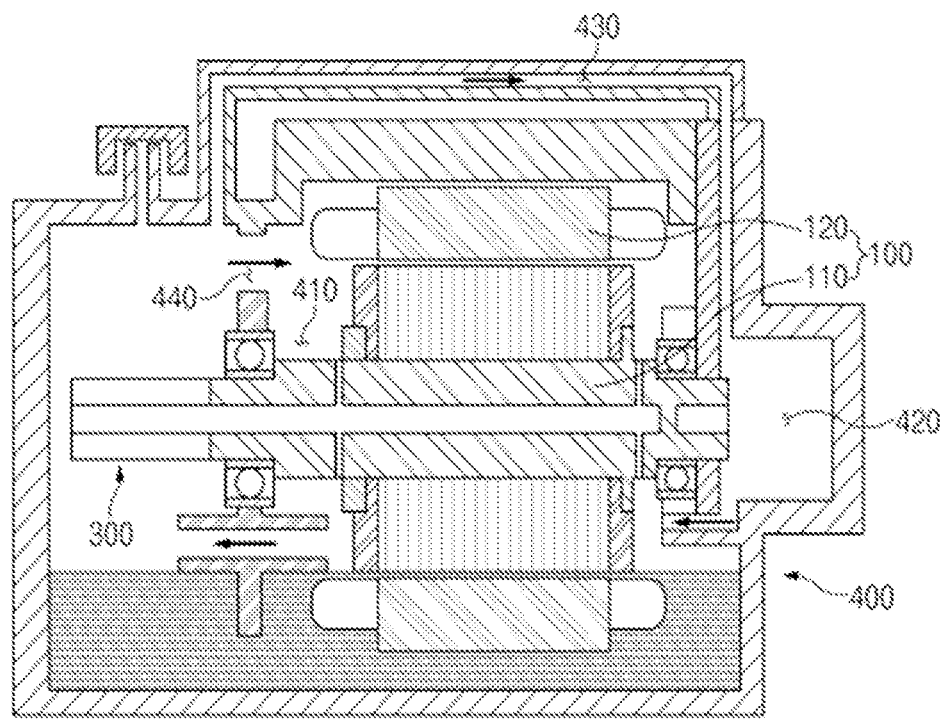
FIG. 1 is a schematic cross-sectional view illustrating an inner structure of a motor operating module according to the present disclosure.

Hereinafter, a structure of a motor operating module and a flow passage of a cooling fluid within the motor operating module according to the present disclosure will be described with reference to the drawings. For reference, dashed-line arrows illustrated in the drawings indicate flow passages of a cooling fluid within the motor operating module according to the present disclosure.

Motor Operating Module

FIG. 1 is a schematic cross-sectional view illustrating an inner structure of a motor operating module according to the present disclosure.

The motor operating module according to the present disclosure may be a component which is mounted to an automobile and provides a driving force to the automobile. However, the motor operating module according to the present disclosure is not limited to the automobile and may be mounted to various types of devices.

As illustrated in FIG. 1, the motor operating module according to the present disclosure may include a motor 100. The motor 100 may include a rotor 110 and a stator 120. When electric energy is supplied to the stator 120, the rotor 110 may be rotated by a change in a magnetic field formed in the stator 120. The detailed operation method of the motor including the rotor and the stator is well-known, and thus, description thereof will be omitted.

Here, the motor operating module according to the present disclosure may further include a gear unit 300 which is provided on one side of the motor 100 and receives torque of the rotor 110 and transmits the torque to the outside. Also, the motor operating module according to the present disclosure may include a housing 400 having an inner space and accommodating the motor 100 and the gear unit 300. As described later, the housing 400 may be a component not only for accommodating the motor 100 and the gear unit 300, but also for forming a space and flow paths through which a cooling fluid for cooling the motor 100 flows.

More specifically, the inner space of the housing 400 may include: a front space 410 formed on one side of the motor 100; and a rear space 420 formed on the other side of the motor 100. Referring to FIG. 1, the front space 410 may be formed on one side of the motor 100, and the rear space 420 may be formed on the other side of the motor 100 opposite to the one side. FIG. 1 illustrates a state in which the front space 410 is provided on the left side of the motor 100, and the rear space 420 is provided on the right side of the motor 100.

Also, the structure and function of the gear unit 300 will be described later with reference to another drawing.

Continuing to refer to FIG. 1, the motor operating module according to the present disclosure may further include a rear-facing connection flow path 430 which extends from the front space 410 toward the rear space 420. As described later, the rear-facing connection flow path 430 may be a component for providing a flow passage of a cooling fluid so that the cooling fluid churned by gears of the gear unit 300 flows into the rear space 420. That is, according to the present disclosure, the cooling fluid, which is present in a lower region of the housing 400, is churned by the rotation of the gear unit 300 and flows into the rear-facing connection flow path 430. Then, the cooling fluid may flow into the rear space 420 via the rear-facing connection flow path 430.

Figure 2:
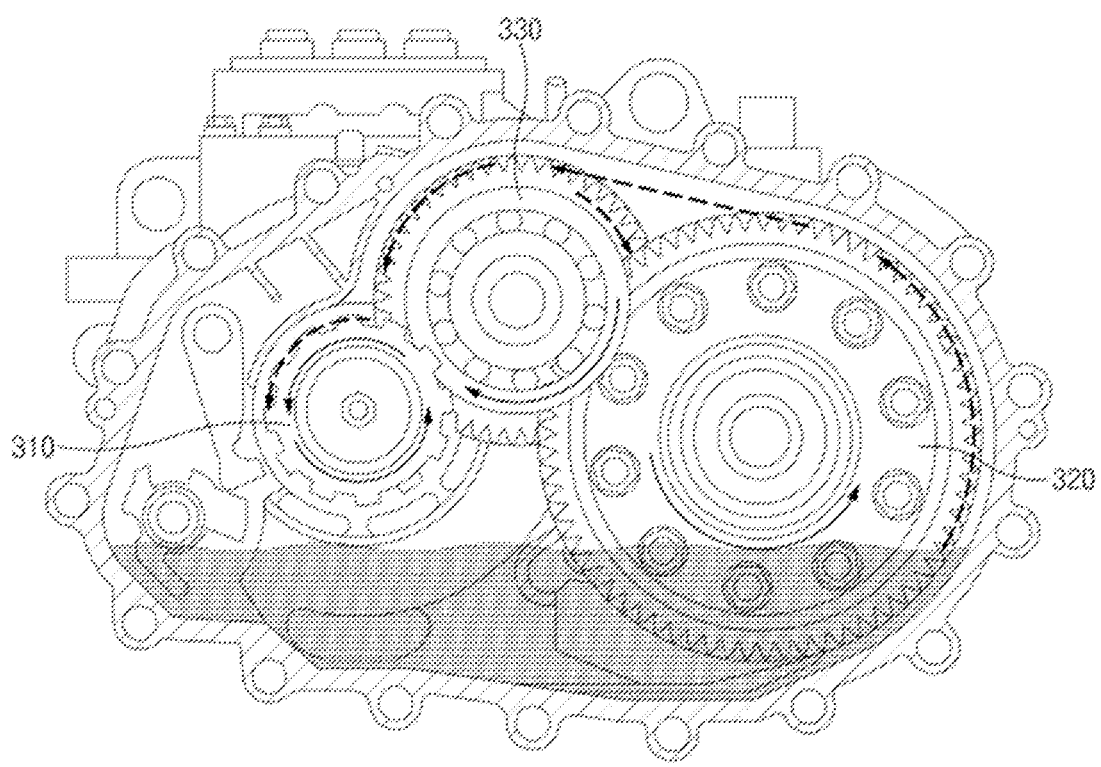
FIG. 2 is a widthwise cross-sectional view showing a gear structure of the motor operating module according to the present disclosure and a flow passage of a cooling fluid by rotation of gears.
Figure 3:
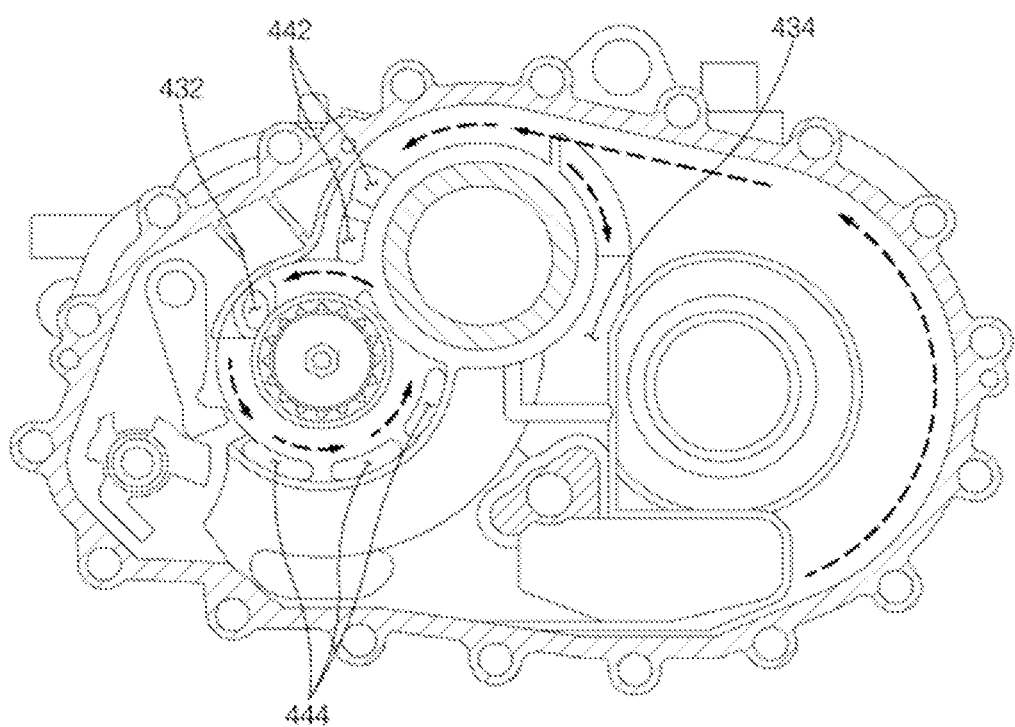
FIG. 3 is a lengthwise cross-sectional view showing an inner structure of a housing of the motor operating module according to the present disclosure and a flow passage of the cooling fluid.

FIG. 2 is a widthwise cross-sectional view showing a gear structure of the motor operating module according to the present disclosure and a flow passage of the cooling fluid by rotation of gears, and FIG. 3 is a lengthwise cross-sectional view showing an inner structure of the housing of the motor operating module according to the present disclosure and a flow passage of the cooling fluid.

Referring to FIGS. 1 to 3, the motor operating module according to the present disclosure may include the gear unit 300. The gear unit 300 may include: an input gear 310 coupled to the rotor 110 of the motor 100; an output gear 320 receiving the torque of the rotor 110 from the input gear 310; and a transmission gear 330 which is provided between the input gear 310 and the output gear 320 so as to engage with the input gear 310 and the output gear 320 and which transmits the torque of the rotor 110 to the output gear 320. As described above, the transmission gear 330 may engage with the input gear 310 and the output gear 320. Thus, the rotation direction of the input gear 310 and the rotation direction of the transmission gear 330 may be opposite to each other, and the rotation direction of the output gear 320 and the rotation direction of the transmission gear 330 may also be opposite to each other. Thus, the input gear 310 and the output gear 320 may have the same rotation direction. Also, as illustrated in FIGS. 2 and 3, a lower end portion of the output gear 320 may be provided below lower end portions of the input gear 310 and the transmission gear 330. More preferably, the lower end portion of the output gear 320 may be submerged in the cooling fluid provided in the lower region of the housing 400.

Referring to FIGS. 2 and 3, through the rotation of the rotor 110 by operation of the motor 100, the input gear 310 coupled to the rotor 110 is rotated. Accordingly, the torque is transmitted to the transmission gear 330 and the output gear 320. Thus, the output gear 320 rotates. Here, since the lower end portion of the output gear 320 may be submerged in the cooling fluid provided in the lower region of the housing 400, the cooling fluid may be churned upward by the rotation of the output gear 320. As illustrated in FIG. 2, when the output gear 320 rotates (when the output gear 320 rotates in a counter-clockwise direction in FIGS. 2 and 3) so that the lower end portion of the output gear 320 moves to the opposite side to the side on which the input gear 310 and the transmission gear 330 are provided, the cooling fluid may be conveyed by the output gear 320 to an upper region of the housing 400 along the outer surface of the housing 400.

Also, according to the present disclosure, a plurality of rear-facing connection flow paths 430 may be provided in the housing 400. Thus, the cooling fluid, which is present in the lower region of the housing 400, is churned by the rotation of the gear unit 300, more specifically, by the rotation of the output gear 320. Then, the cooling fluid may flow into the rear space 420 via the plurality of rear-facing connection flow paths 430.

Referring to FIG. 3, the rear-facing connection flow path 430 may include a first rear-facing connection flow path 432 formed in an outer region (an upper left region of the input gear 310 in FIG. 3) which, among outer regions of the input gear 310, faces an outer surface of the housing 400. Also, the rear-facing connection flow path 430 may further include a second rear-facing connection flow path 434 formed between the output gear 320 and the transmission gear 330.

As described above, when the output gear 320 rotates and conveys the cooling fluid to the upper region of the housing 400 along the outer surface of the housing 400, a portion of the conveyed cooling fluid falls down after going through an upper region of the transmission gear 330. Here, the cooling fluid falling down after going through the upper region of the transmission gear 330 may flow into the first rear-facing connection flow path 432.

Here, when the output gear 320 rotates in a counter-clockwise direction as illustrated in FIG. 2, the transmission gear 330 rotates in a clockwise direction that is the opposite direction to that of the output gear 320. Through this rotation of the transmission gear 330, another portion of the cooling fluid arriving at the upper region of the transmission gear 330 falls between the output gear 320 and the transmission gear 330. Here, the cooling fluid falling between the output gear 320 and the transmission gear 330 may flow into the second rear-facing connection flow path 434.

Figure 4:
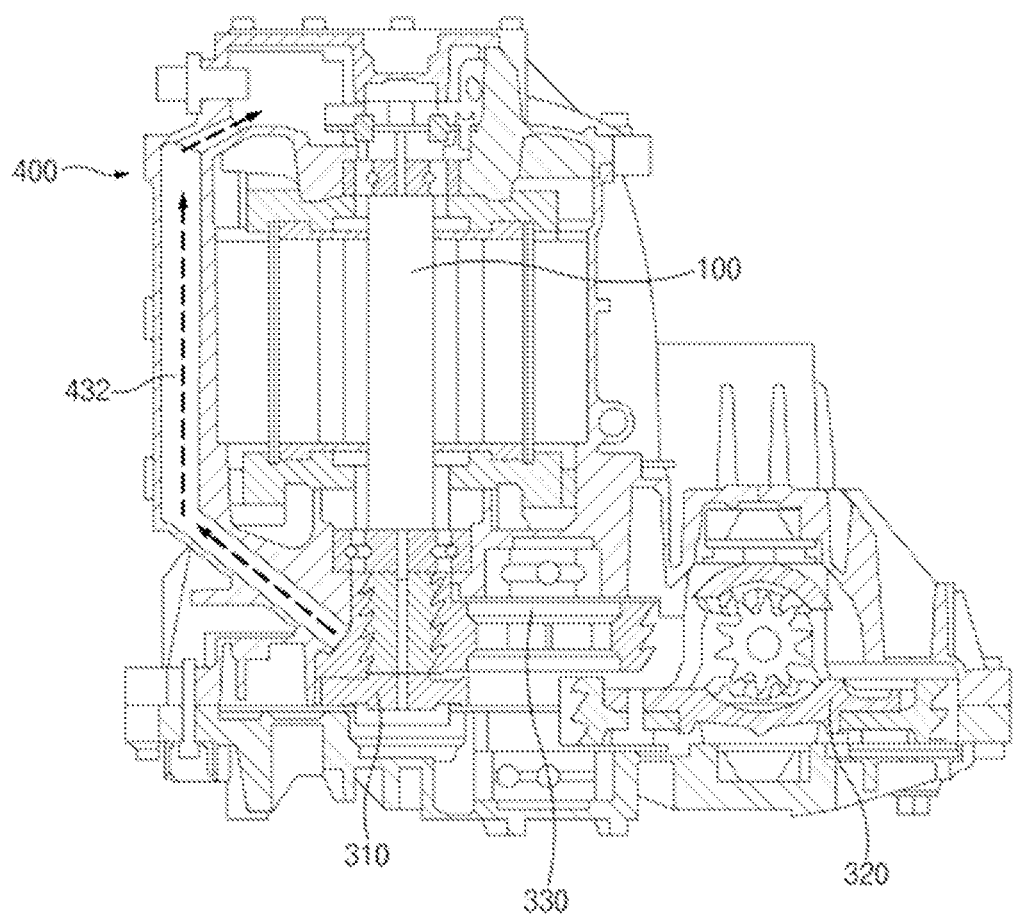
FIG. 4 is a lengthwise cross-sectional view illustrating a flow passage of a cooling fluid that flows through a first rear-facing connection flow path of the housing in the motor operating module according to the present disclosure.
Figure 5:
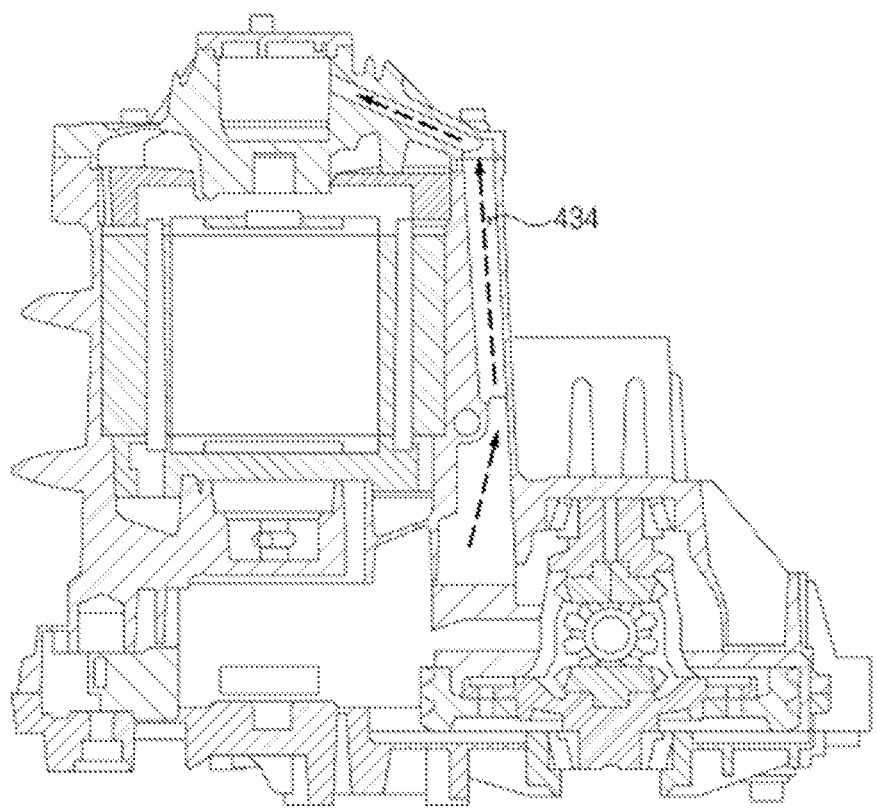
FIG. 5 is a lengthwise cross-sectional view illustrating a flow passage of a cooling fluid that flows through a second rear-facing connection flow path of the housing in the motor operating module according to the present disclosure.

FIG. 4 is a lengthwise cross-sectional view illustrating a flow passage of a cooling fluid that flows through the first rear-facing connection flow path of the housing in the motor operating module according to the present disclosure, and FIG. 5 is a lengthwise cross-sectional view illustrating a flow passage of a cooling fluid that flows through the second rear-facing connection flow path of the housing in the motor operating module according to the present disclosure.

As illustrated in FIGS. 4 and 5, at least a portion of the first rear-facing connection flow path 432 or the second rear-facing connection flow path 434 may be provided adjacent to the outer surface of the housing 400. For this, with respect to the direction in which the cooling fluid flows, a section facing the outer surface of the housing 400 may be formed in at least a portion of the first rear-facing connection flow path 432 or the second rear-facing connection flow path 434. For this, with respect to the direction in which the cooling fluid flows, a section directed from the outer surface of the housing 400 toward the rear space 420 may be formed in at least a portion of the first rear-facing connection flow path 432 or the second rear-facing connection flow path 434. In each of FIGS. 4 and 5, with respect to the direction in which the cooling fluid flows, upstream regions of the first rear-facing connection flow path 432 and the second rear-facing connection flow path 434 are formed to face the outer surface of the housing 400, midstream regions of the first rear-facing connection flow path 432 and the second rear-facing connection flow path 434 are formed to be parallel to the outer surface of the housing 400, and downstream regions of the first rear-facing connection flow path 432 and the second rear-facing connection flow path 434 are formed to face the rear space 420.

As described above, when some regions of the rear-facing connection flow paths 432 and 434 are adjacent to the outer surface of the housing 400, the cooling fluid may smoothly exchange heat with the outside of the housing 400 while flowing through the rear-facing connection flow paths 432 and 434. Thus, the temperature of the cooling fluid, which flows into the rear space 420 through the rear-facing connection flow paths 432 and 434, falls, and thus, the cooling efficiency of the motor operating module through the cooling fluid may be enhanced.

Also, according to the present disclosure, a section inclined downward toward the rear space 420 (in the direction in which the cooling fluid flows) may be formed in at least a portion of the first rear-facing connection flow path 432 or the second rear-facing connection flow path 434 so that the cooling fluid may efficiently flow into the rear space 420 through the rear-facing connection flow paths 432 and 434. More preferably, the downward inclined sections may be formed in all of the first rear-facing connection flow path 432 and the second rear-facing connection flow path 434.

Figure 6:
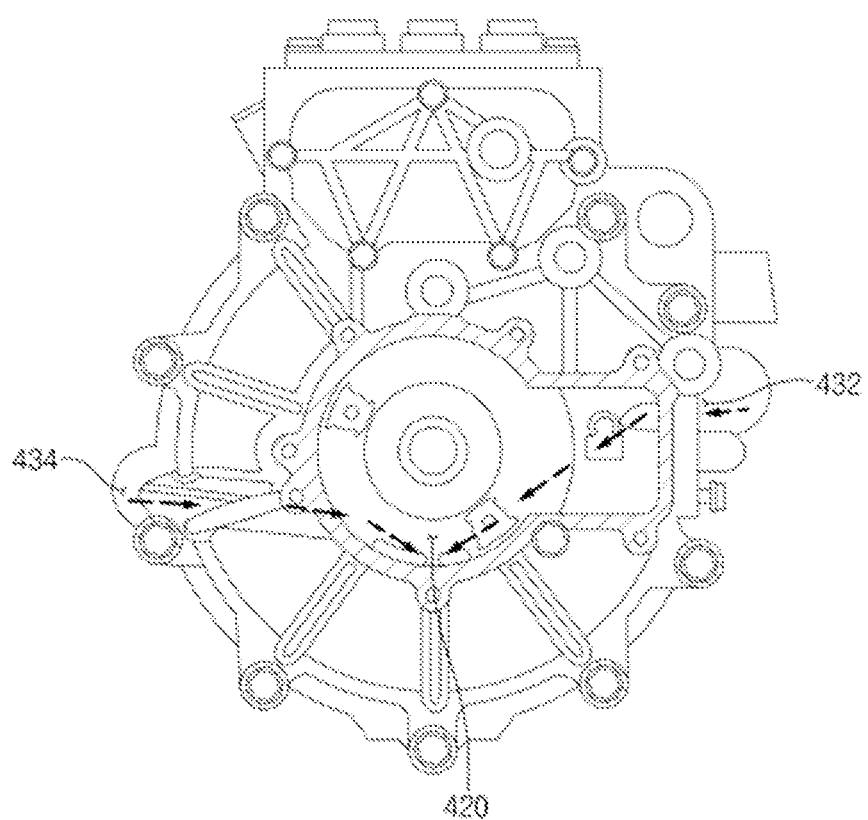
FIG. 6 is a widthwise cross-sectional view illustrating a flow passage in which the cooling fluid flows into a rear space through a rear-facing connection flow path in the motor operating module according to the present disclosure.
Figure 7:
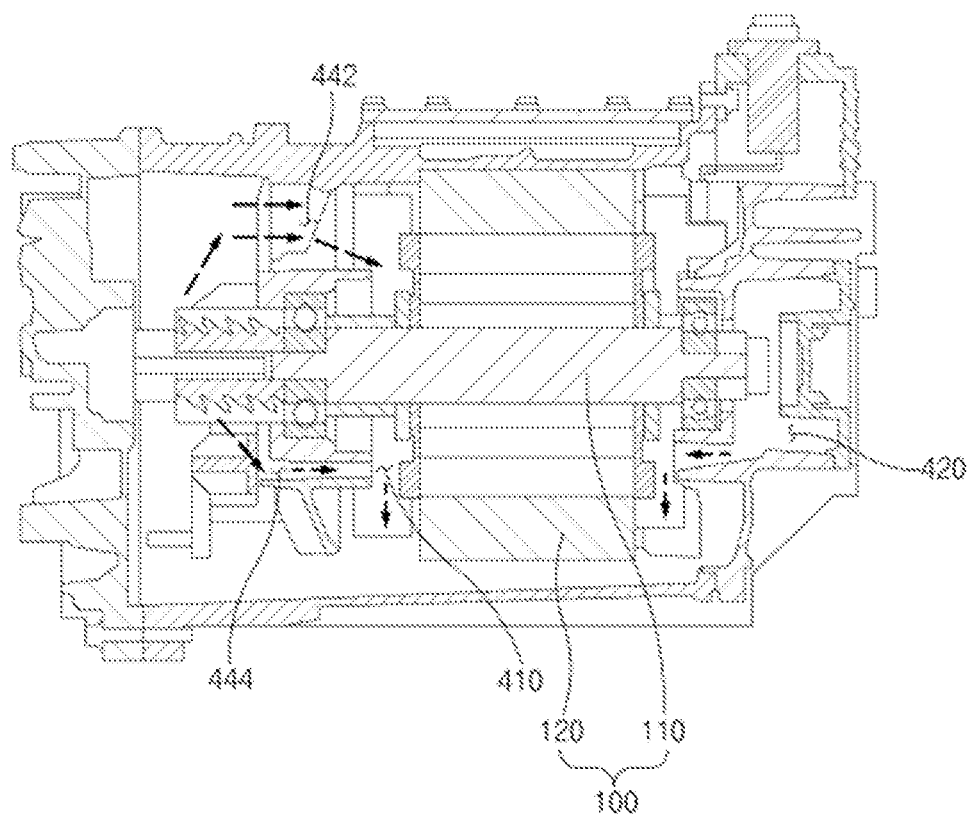
FIG. 7 is a lengthwise cross-sectional view illustrating a flow passage in which the cooling fluid, which has flowed into a front space and the rear space, flows into a motor in the motor operating module according to the present disclosure.

FIG. 6 is a widthwise cross-sectional view illustrating a flow passage in which a cooling fluid flows into the rear space through the rear-facing connection flow path in the motor operating module according to the present disclosure, and FIG. 7 is a lengthwise cross-sectional view illustrating a flow passage in which a cooling fluid, which has flowed into the front space and the rear space, flows into the motor in the motor operating module according to the present disclosure.

As illustrated in FIGS. 6 and 7, the cooling fluid, which has flowed through the first rear-facing connection flow path 432 and the second rear-facing connection flow path 434, may flow into the rear space 420.

Here, according to the present disclosure, the rear space 420 may communicate with the stator 120 provided in the motor 100. Thus, the cooling fluid, which has flowed into the rear space 420, may flow into the stator 120. For example, the cooling fluid, which has flowed into the rear space 420, may flow into the stator 120 by gravity.

Also, as illustrated in FIG. 7, the stator 120 may include an upper region provided above the rotor 110 and a lower region provided below the rotor 110. Here, the cooling fluid, which has flowed into the rear space 420, may flow into the lower region of the stator 120. More specifically, the cooling fluid, which has flowed into the rear space 420, may flow into a coil of the lower region of the stator 120, and thus, the coil may be cooled.

In addition to the flow paths described above, flow paths through which the cooling fluid flows may be formed in the motor operating module. Generally, the cooling fluids cool internal components of the motor operating module while falling from the upper region of the motor operating module toward the lower region thereof. Here, the cooling fluid rises in temperature due to the heat exchange while falling from the upper region of the motor operating module toward the lower region thereof, and thus, the cooling efficiency through the cooling fluid is reduced gradually toward the lower region of the motor operating module. This is also true with respect to the upper region and the lower region of the stator provided in the motor.

However, when the cooling fluid, which has flowed into the rear space 420, flows directly into the lower region of the stator 120 as in the present disclosure, at least a portion of the cooling fluid flows into the lower region of the stator 120 without going through the upper region of the stator 120. Thus, the lower region of the stator 120 may be cooled effectively. In particular, taking into consideration the characteristics of the motor, a coil provided in the stator has the highest temperature in the motor. Thus, the coil provided in the lower region of the stator 120 may be cooled effectively.

Here, referring to FIGS. 1, 3, and 7, the inner space of the housing 400 of the motor operating module according to the present disclosure may further include a stator-facing connection flow path 440 which extends from the front space 410 toward the stator 120 and provides a path through which the cooling fluid flows. Similar to the rear-facing connection flow path 430, the stator-facing connection flow path 440 may also be a component for cooling the stator 120 provided in the motor 100. However, the stator-facing connection flow path 440 is connected directly to the front space 410 and the stator 120 without going through the rear space 420, and thus, the length of the stator-facing connection flow path 440 may be less than the length of the rear-facing connection flow path 430.

According to the present disclosure, the cooling fluid, which is present in the lower region of the housing 400, is churned by the rotation of the gear unit 300, more specifically, by the rotation of the output gear 320. Subsequently, the cooling fluid flows into the front space 410 and then may flow into the stator 120 via the stator-facing connection flow path 440.

Also, a plurality of stator-facing connection flow paths 440 may be provided. For example, as illustrated in FIGS. 2 and 3, the stator-facing connection flow path 440 may include: a first stator-facing connection flow path 442 which is formed in a region of the transmission gear 330 on the opposite side from a region facing the output gear 320; and a second stator-facing connection flow path 444 which is formed in a region of the input gear 310 on the opposite side from a region facing the transmission gear 330. Here, the transmission gear 330 is provided above the input gear 310 and the output gear 320, and thus, the first stator-facing connection flow path 442 may be formed above the second stator-facing connection flow path 444. Also, the input gear 310 may be provided between the first stator-facing connection flow path 442 and the second stator-facing connection flow path 444.

Also, a plurality of first stator-facing connection flow paths 442 and a plurality of second stator-facing connection flow paths 444 may be provided. For example, as illustrated in FIG. 3, the plurality of first stator-facing connection flow paths 442 may be formed along a circumferential direction of the transmission gear 330, and the plurality of second stator-facing connection flow paths 444 may be formed along a circumferential direction of the input gear 310.

Continuing to refer to FIG. 7, the cooling fluid, which has flowed from the front space 410 into the first stator-facing connection flow path 442, may flow into the upper region of the stator 120. Also, the cooling fluid, which has flowed from the front space 410 into the second stator-facing connection flow path 444, may flow into the lower region of the stator 120.

More specifically, the cooling fluid, which has flowed from the front space 410 into the first stator-facing connection flow path 442, may flow into the upper region of the stator 120, thereby cooling the upper region of the stator 120. Furthermore, the cooling fluid may flow into the lower region of the stator 120 by the rotation of the rotor 110 after flowing into the upper region of the stator 120, thereby also cooling the lower region (in particular, a coil provided in the lower region of the stator 120) of the stator 120. Also, the cooling fluid, which has flowed from the front space 410 into the second stator-facing connection flow path 444, may flow into the lower region of the stator 120, thereby cooling the lower region (more preferably, the coil provided in the lower region of the stator 120) of the stator 120.

According to the present disclosure, the fluid for cooling is allowed to circulate around the motor and the surroundings thereof without a separate pump, and thus, the cooling function to the motor may be performed without a separate pump.

Also, according to the present disclosure, the amount of the oil for cooling that does not properly contribute to the cooling during the circulation of the oil is minimized, and thus, the cooling efficiency of the motor may be improved.

Also, the present disclosure provides for minimizing an amount of an oil for cooling that does not properly contribute to cooling during circulation of the oil, thereby improving cooling efficiency of the motor.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A motor operating module comprising:
 a motor comprising a rotor and a stator;
 a gear unit provided on one side of the motor, and being configured to receive torque of the rotor and to transmit the torque to outside; and
 a housing configured to accommodate the motor and the gear unit in an inner space,
 wherein the inner space of the housing comprises:
  a front space formed on a first side of the motor;
  a rear space formed on a second side of the motor opposite to the first side;
  rear-facing connection flow paths extending from the front space toward the rear space and providing a path for a cooling fluid to flow; and
  the cooling fluid is churned by the rotation of the gear unit to flow from a lower region of the housing into the rear space via the rear-facing connection flow paths,
 wherein the gear unit comprises:
  an input gear coupled to the motor;
  an output gear configured to receive the torque of the rotor from the input gear; and
  a transmission gear engaging with the input gear and the output gear and being configured to transmit the torque of the rotor from the input gear to the output gear,
 wherein the cooling fluid is churned by the rotation of the output gear and flows into the rear space via the rear-facing connection flow paths, and
 wherein each of the rear-facing connection flow paths comprises:
  a first rear-facing connection flow path formed in an outer region of the input gear that faces an outer surface of the housing, and
  a second rear-facing connection flow path formed between the output gear and the transmission gear.

2. The motor operating module of claim 1, wherein one of a portion of the first rear-facing connection flow path or a portion of the second rear-facing connection flow path comprises a section inclined downward toward the rear space.

3. The motor operating module of claim 1, wherein one of a portion of the first rear-facing connection flow path or a portion of the second rear-facing connection flow path comprises a section facing the outer surface of the housing.

4. The motor operating module of claim 1, wherein the rear space communicates with the stator, and the cooling fluid flows into the stator.

5. The motor operating module of claim 4, wherein the cooling fluid flows into a lower region of the stator.

6. The motor operating module of claim 1, wherein the inner space of the housing further comprises a stator-facing connection flow path that extends from the front space toward the stator and provides a path through which the cooling fluid flows, and wherein the cooling fluid in the lower region of the housing is churned by the rotation of the gear unit and flows into the front space, and into the stator via the stator-facing connection flow path.

7. The motor operating module of claim 6, wherein the stator-facing connection flow path comprises a first stator-facing connection flow path formed in a region of the transmission gear on an opposite side from a region facing the output gear.

8. The motor operating module of claim 7, wherein the stator-facing connection flow path further comprises a second stator-facing connection flow path formed in a region of the input gear on the opposite side from a region facing the transmission gear.

9. The motor operating module of claim 8, wherein the first stator-facing connection flow path is formed above the second stator-facing connection flow path.

10. The motor operating module of claim 9, wherein the cooling fluid flows from the front space into the first stator-facing connection flow path and into an upper region of the stator.

11. The motor operating module of claim 9, wherein the cooling fluid flows from the front space into the second stator-facing connection flow path and into a lower region of the stator.

12. The motor operating module of claim 1, wherein a plurality of stator-facing connection flow paths are provided in the inner space of the housing.

13. The motor operating module of claim 12, wherein the plurality of stator-facing connection flow paths comprise a plurality of first stator-facing connection flow paths that are formed along a circumferential direction of the transmission gear.

14. The motor operating module of claim 13, wherein the plurality of stator-facing connection flow paths comprise a plurality of second stator-facing connection flow paths that are formed along a circumferential direction of the input gear.

\* \* \* \* \*